(12) United States Patent
Bartolo et al.

(10) Patent No.: US 9,869,224 B2
(45) Date of Patent: Jan. 16, 2018

(54) AMMONIA GENERATING DEVICE

(71) Applicant: Faurecia Systemes D'Echappement, Nanterre (FR)

(72) Inventors: Xavier Bartolo, Bois le Roi (FR); David Gafforelli, Audincourt (FR)

(73) Assignee: Faurecia Systemes D'Echappement, Nanterre (FR)

( * ) Notice: Subject to any disclaimer, the term of this patent is extended or adjusted under 35 U.S.C. 154(b) by 1266 days.

(21) Appl. No.: 13/906,855

(22) Filed: May 31, 2013

(65) Prior Publication Data

US 2013/0327020 A1    Dec. 12, 2013

(30) Foreign Application Priority Data

Jun. 6, 2012  (FR) ...................................... 12 55274

(51) Int. Cl.
*F01N 3/10*  (2006.01)
*F01N 3/08*  (2006.01)
*F01N 3/20*  (2006.01)

(52) U.S. Cl.
CPC ............. *F01N 3/08* (2013.01); *F01N 3/2066* (2013.01); *F01N 2610/02* (2013.01); *F01N 2610/06* (2013.01); *F01N 2610/10* (2013.01); *F01N 2610/107* (2013.01); *F01N 2610/1406* (2013.01); *Y02T 10/24* (2013.01); *Y10T 137/8376* (2015.04)

(58) Field of Classification Search
CPC ...... F01N 3/08; F01N 3/2066; F01N 2610/02; F01N 2610/06; F01N 2610/10; F01N 2610/107
See application file for complete search history.

(56) References Cited

U.S. PATENT DOCUMENTS

| 6,024,142 | A | * | 2/2000 | Bates | ...................... | B67D 7/145 |
| | | | | | | 141/351 |
| 6,301,879 | B1 | * | 10/2001 | Weisweiler | ........ | B01D 53/9431 |
| | | | | | | 423/237 |
| 6,935,103 | B2 | * | 8/2005 | Binder | .................. | F01N 3/2066 |
| | | | | | | 60/274 |
| 2010/0300081 | A1 | * | 12/2010 | Fulks | ...................... | C01C 1/006 |
| | | | | | | 60/299 |

FOREIGN PATENT DOCUMENTS

| DE | 10313998 A1 | 10/2004 |
| DE | 10323591 A1 | 12/2004 |
| DE | 102009047338 A1 | 6/2011 |
| DE | 102010062985 A1 | 4/2012 |

OTHER PUBLICATIONS

FR Search report from corresponding FR 12 55274, filed Jun. 6, 2012.

* cited by examiner

*Primary Examiner* — Phutthiwat Wongwian
*Assistant Examiner* — Matthew T Largi
(74) *Attorney, Agent, or Firm* — Carlson, Gaskey & Olds, PC (57) ABSTRACT

An ammonia generating device is used for the treatment of exhaust gases of internal combustion engines, particularly for motor vehicles. The device includes a tank having a body capable of releasing ammonia by desorption. The device is also provided with a first single connection member comprising an electrical connection to supply the device with electricity and a fluid connection to allow evacuation of the ammonia produced following the desorption reaction.

17 Claims, 4 Drawing Sheets

FIG. 4

AMMONIA GENERATING DEVICE

TECHNICAL FIELD

The present invention relates to an ammonia generating device to be used for the treatment of exhaust gases of internal combustion engines, as well as a vehicle equipped with such a device. More particularly, the ammonia generating device comprises of a tank containing a body capable of releasing ammonia by desorption.

BACKGROUND

The documents DE 10 2009 047 338 and WO2008/077652 disclose various devices capable of releasing ammonia in the exhaust line of a motor vehicle.

Vehicles equipped with such devices must, as these devices have depleted their supply of ammonia and are therefore no longer able to release ammonia, be brought back to the auto dealership and service center in order for the body contained in the tank to be refilled with ammonia. The user of the vehicle must thus be alerted, for example, by the Engine Control Unit—ECU of the vehicle, that they need to go quickly to the dealership and service center in order to have their device refilled with ammonia.

Such a recommendation is constraining, in particular if it does not coincide with a scheduled maintenance of the vehicle.

SUMMARY

The ammonia generating device according to the invention is intended to overcome these drawbacks, by providing a device which can be easily installed in the vehicle by the user, without the use of specific tools, but also without any risk of ammonia poisoning to the user.

An ammonia generating device of the aforementioned type is provided with a first single connection member comprising an electrical connection to supply the device with electricity and a fluid connection to allow evacuation of the ammonia produced following the desorption reaction.

According to other embodiments, the ammonia generating device may include one or more of the following characteristic features, considered individually or in accordance with any technically possible combinations:

the device may contain a heating device disposed within the tank to heat the body in the tank and to thereby induce the desorption reaction;

the body that is capable of releasing ammonia may be in the form of flat discs whose exterior diameter has a shape that is complementary to the interior wall of the tank;

the tank may be disposed within a protective receptacle;

the dimensions of the protective receptacle may be greater than the dimensions of the tank such that a space is left between at least one of the walls of the tank and a wall of the protective receptacle disposed so as be face to face with it;

the space may be filled by an insulating foam in a manner to reduce the transfer of heat between the walls of the tank and those of the protective receptacle;

the protective receptacle may comprise a discharge channel communicating with the space extending between the tank and the protective receptacle and adapted to evacuate the ammonia present in the space;

the device can be provided with at least one gripping handle;

the first single connection member may be capable of cooperating with a second single connection member connected to the electrical power supply as well as to an exhaust line of the engine, the second member comprising an electrical connection and a fluid connection, the engagement of the first and the second single connection members causing the engagement with one another of the electrical connection and the fluid connection belonging respectively to the first and second single connection members;

the first single connection member and the second single connection member can be assembled by a locking/unlocking system, wherein the maneuvering of the gripping handle actuates the locking/unlocking system;

the device may be provided with a memory element that is read/write accessible making it possible to obtain information and details specific to the device and useful to its operation, such as a radio frequency identification—(RFID) chip.

The invention also relates to a vehicle equipped with an ammonia generating device according to the invention.

According to other embodiments, the vehicle may include one or more of the following characteristic features, considered individually or in accordance with any technically possible combinations:

the vehicle may include a locking mechanism designed for ensuring that the device is maintained in position in a housing mounted in the vehicle;

the locking mechanism may comprise a lever controlling the engagement of the first and second single connection members in a manner to enable the engagement with one another of the electrical connection and the fluid connection belonging respectively to the first and second single connection members;

the lever can control the movement of pins intended for cooperating with openings provided in a wall of the device;

The invention also relates to a method for operating an ammonia generating device according to the invention that is disposed in a motor vehicle, wherein:

in the course of a given step the first single connection member is disconnected from the second single connection member to allow the removal of the device from the vehicle, and in the course of a further step, the first single connection member is connected to the second single connection member to enable the engagement with one another of the electrical connection and the fluid connection belonging respectively to the first and second single connection members.

These and other features may be best understood from the following drawings and specification.

BRIEF DESCRIPTION OF THE DRAWINGS

The invention will be better understood upon reading the description which follows, given solely by way of example and with reference made to the accompanying drawings wherein.

DETAILED DESCRIPTION

Figure 1:
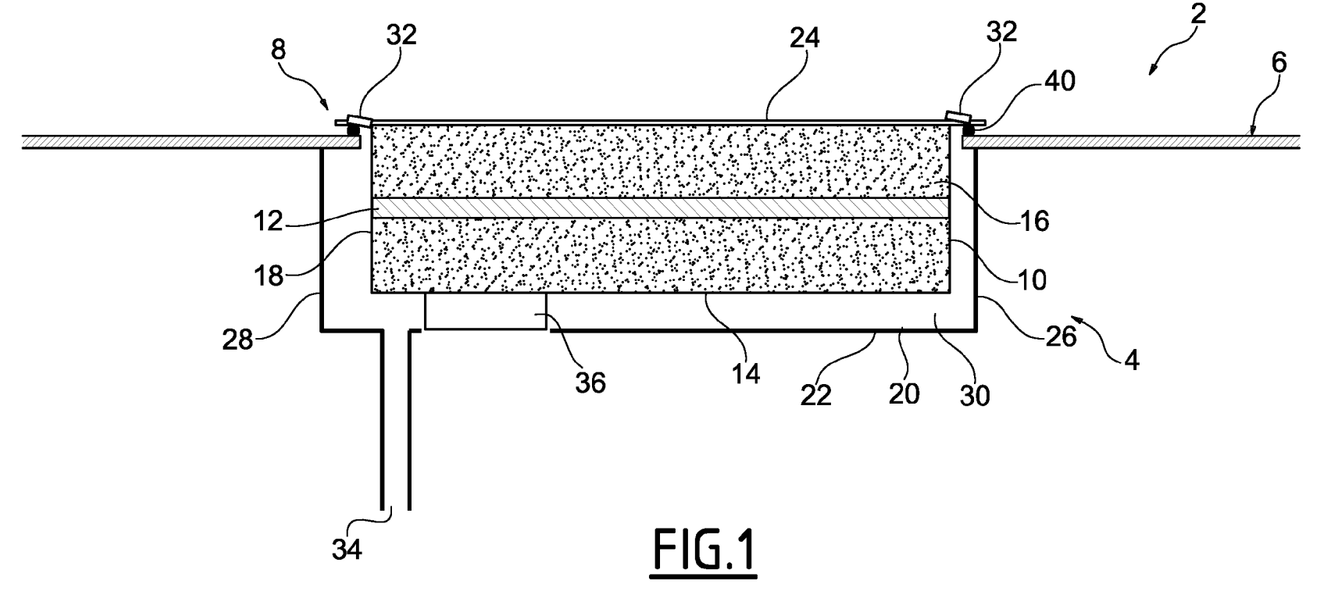
FIG. 1 shows a longitudinal cross sectional view of an ammonia generating device according to the invention installed in the trunk of a motor vehicle.

As shown in FIG. 1, a rear part of a floor 6 of a vehicle has an opening 8 provided for allowing insertion of an ammonia generating device 4 in a manner such that the latter is arranged in an installed position beneath the level of the trunk floor 6.

The floor 6 of the vehicle is manufactured in a conventional manner by an assembly of metal sheets formed by pressing—stamping, and which are joined to each other by welding.

The ammonia generating device 4 is capable of releasing ammonia, the latter being used as a reducing agent for the treatment of nitrogen oxides contained in the exhaust gas of an internal combustion engine of the vehicle.

The ammonia generating device 4 includes a tank 10 that is suitable for allowing the storage of an element which can release ammonia by desorption, such as a saturated ammonium salt, for example, and a heating device 12 used for heating the saturated ammonium salt contained inside the tank 10 to allow the release of ammonia gas following a desorption reaction.

The saturated ammonium salt contained within the tank 10 may be present in the form of flat discs having an exterior diameter which has a shape that is complementary to the interior wall of the tank.

The storage material enabling the release of ammonia as a result of a desorption reaction may be one of the materials described in the patent application WO 2008/077652. The material is, for example, selected from among the group known under the name of metal ammine complexes, and having the general formula $M_a\,(NH_3)_n e_z$, wherein M is one or more cations selected from among the group of alkali metals, such as Li, Na, K or Cs; of alkaline earth metals such as Mg, Ca, or Sr; and/or transition metals such as V, Cr, Mn, Fe, Co, Ni, Cu, or Zn; or combinations of these metals such as NaAl, KAl, $K_2Zn$, CsCu or $K_2Fe$; X being one or more anions selected from among the group comprising of fluorides, chlorides, bromides, iodides, nitrates, thiocyanates, sulfates, molybdates, phosphate ions; a being the number of cations per molecule of salt; z being the number of anions per molecule of salt; and n being a coordination number from 2 to 12. For example, the material forming the cartridge is $Mg\,(NH_3)_6Cl_2$, or $Sr\,(NH_3)_8Cl_2$, or $Ca\,(NH_3)_8Cl_2$, or a mixture of these elements.

The tank 10 has a hollow hermetically sealed body. The body of the tank 10 is of a substantially cylindrical shape and is delimited by a lateral wall 14 extending along the longitudinal axis X-X of the vehicle, as well as by a front wall 16 and a rear wall 18 extending to face respectively the front portion and the rear portion of the vehicle.

By way of a variant, the body of the tank 10 may also be of a parallelepipedal shape.

The body of the tank 10 is made out of metal, preferably of aluminum or stainless steel. The chosen material should not oxidize in the presence of ammonia.

The tank 10 is disposed within a protective receptacle 20, of substantially parallelepipedal shape. The protective receptacle 20 is delimited by a bottom wall 22, a top wall 24 and two lateral walls disposed to face the lateral wall of the tank, by a front wall 26 disposed to face the front wall 16 of the tank, and by a back wall 28 disposed to face the rear wall 18 of the tank.

The protective receptacle 20 is designed in a manner to protect the tank 10 from any external shock, but also, as will be described later, to thermally insulate the tank 10.

The protective receptacle 20 may be fabricated out of metal or plastic. Preferably a plastic material that is flexible and capable of protecting the tank 10 from a shock may be selected.

The dimensions of the protective receptacle 20 are greater than those of the tank 10 such that a space 30 may be left between the front walls 16 and 26, the rear walls 18 and 28, belonging respectively to the tank 10 and the protective receptacle 20, and also between the lateral wall 14 of the tank 10 and the bottom walls 22 and lateral walls of the protective receptacle 20.

The space 30 present between the walls of the tank 10 and those of the protective receptacle 20 may in particular be held in place with the help of spacers, not shown, disposed between each corresponding wall and for keeping the tank 10 at a distance as described above.

Thus the tank 10 is disposed in the protective receptacle 20 in such a way that its upper portion is positioned close to the top wall 24 of the protective receptacle 20.

Preferably, the space 30 is filled with an insulating foam to reduce the transfer of heat between the walls of the tank 10 and those of the protective receptacle 20.

Preferably, the upper wall 24 of the protective receptacle is provided with a rim, not highlighted in the Figures, designed to ensure the leak proof sealing between the protective receptacle 20 and the floor of the vehicle 6.

Preferably, the top wall 24 of the protective receptacle is provided with gripping handles 32 to facilitate the setting in place or removal of the protective receptacle 20 from the trunk of the vehicle. According to a preferred embodiment, there may be two of these handles 32 provided. These handles 32 are preferably arranged such that one of them is close to the front walls 16 and 26 and the other is close to the rear walls 18 and 28.

Preferably, the gripping handles 32 are made out of a material that conducts very little or no heat, for example out of plastic material, to protect the user who is operating the ammonia generating device.

By way of a variant, the gripping handles 32 may be made out of metal and thermally decoupled from the top wall 24 of the protective receptacle.

Furthermore, the bottom wall 22 of the protective receptacle 20 comprises a discharge channel 34 communicating with the space 30 extending between the tank 10 and the protective receptacle 20 and adapted for discharging the ammonia present accidentally in this space 30, for example due to the leak proof sealing of the tank 10 against the exterior of the vehicle being compromised.

In addition, the bottom wall 22 of the protective receptacle 20 is provided with a first single connection member 36 capable of cooperating with a second single connection member 38, the latter being connected to the electric power supply as well as to the exhaust line of the vehicle.

During their cooperation, the first single connection member 36 and the second single connection member 38 are assembled with the aid of a locking/unlocking system that is controllable by a user. This locking/unlocking system may for example include attachment points belonging respectively to the first single connection member 36 and the second single connection member 38 that are capable of cooperating with each other, this type of system is known per se and will not be described in detail here.

This first single connection member 36 comprises electrical connection for supplying electrical power to, in particular, the heat generator 12 of the ammonia generating device 4, as well as to the fluid connection intended for permitting the discharge of ammonia from the ammonia generating device following the desorption reaction to the exhaust line of the vehicle, not shown.

The first single connection member 36 includes a first electrical connector and a first fluid connector.

In the same way, the second single connection member 38 comprises a second electrical connector, capable of cooperating with the first electrical connector, and a second fluid connector, capable of cooperating with the first fluid connector, during the assembly of the single connection members 36 and 38.

Thus, the locking/unlocking system, making it possible to assemble the first single connection member 36 and the second single connection 38, allows the engagement of, on the one hand, the first and second electrical connectors, and on the other hand, the first and second fluid connectors.

More particularly, the electrical connection may comprise an electrical connector which can, for example, be integrated with the locking/unlocking system of each connection member.

In the event where the connectors are integrated with the locking/unlocking system, the electrical contact points between the connectors belonging respectively to the first single connection member 36 and the second single connection member 38 are preferably arranged in the attachment points of the locking/unlocking system.

Preferably the locking/unlocking system of the connection members can be actuated by one of the gripping handles 32, the operation of the latter actuating the locking/unlocking system.

According to the example of an embodiment shown in FIG. 1, in the installed position in the vehicle, the top wall 24 of the protective receptacle 20 is flush with the floor 6 of the vehicle.

In this example, in the installed position in the vehicle, the gripping handles 32 are folded back in a manner so as to enable the anchoring and the maintaining in position of the ammonia generating device 4. The anchoring and maintaining of the device in position are also ensured by the extensive rim of the upper wall 24. The leak proof sealing between the protective receptacle 20 and the floor 6 is ensured by a seal 40 that is disposed around the opening 8 and tightly jammed by the rim and the gripping handles 32 during the setting in place of the ammonia generating device 4.

The maintaining of the ammonia generating device 4 in position on the floor 6 is ensured by a locking mechanism that can be mounted on the gripping handles 32 and/or on the extensive rim of the upper wall 24.

Advantageously, the ammonia generating device 4 has a memory element making it possible to obtain information and details specific to the device and useful to its operation. The memory element can thus make it possible, for example, to determine the age of the device, its filling status, the number of times that it has been regenerated, that is to say the number of times the salt was re-saturated with ammonia at the dealership-service station, whether the salt has been changed, whether any anomalies have been encountered during use of the device installed in the vehicle, or during a step of regeneration, etc.

The memory element used may, for example, be a radio frequency identification (RFID) type chip that is read/write accessible by a radio frequency identification (RFID) component element disposed in the vehicle that may in particular be situated close to the ammonia generating device 4. Thus, any defects and deficiencies encountered during the operation of the device can be stored in the memory in the radio frequency identification—RFID chip, such as a heating element deficiency, a possible leakage in the seals of the leak proof sealing system, etc.

Such a chip ensures the traceability of each ammonia generating device.

Such a chip has the advantage of not requiring any power supply when in standby mode. Thus, an ammonia generating device equipped with this chip may be examined even several years after its last use. This chip also has the advantage of being positioned with greater freedom in the ammonia generating device than a wire element.

Moreover, the information contained in such a chip can be read without electrical contact, which ensures that the information contained in the memory element of the device to be analyzed may be read rapidly, easily and in a reliable manner.

Such an ammonia generating device 4 has the advantage of being easily removed from the trunk of the vehicle by using the gripping handles 32, without requiring external assistance, or any specific tools and in a completely safe manner. The tank 10 containing the saturated ammonium salt is hermetically sealed and protected by the protective receptacle 20. In addition, the presence of the protective receptacle limits the sensation of warmth for the user operating the device.

In a similar fashion, the electronic control unit (ECU) of the vehicle is able to probe the memory element of the device and thus know the ammonia capacity thereof, the version of the device being installed in the vehicle in a manner so as to block, as necessary, the operation of a device developed according to an older version. Thus, the ECU of the vehicle will easily identify the installation of a non-regenerated depleted device.

During the operation of the vehicle, when the ECU detects that the ammonia generating device is no longer emitting ammonia and therefore that it is depleted, the ECU will alert the user of the vehicle thereto to ensure that the device in the vehicle is replaced by a new device.

In order to proceed with the removal of the device in the vehicle, the upper wall 24 of the protective receptacle 20 is first detached from the floor of the vehicle. This step can be carried out by maneuvering the gripping handles ensuring the holding in position of the device and/or by releasing the rims of the top wall 24. As previously described here above, the maneuvering of one of the gripping handles can cause the unlocking of the single connection members 36, 38.

Thus, the first and second single connection members 36, 38 can be separated from one another, to permit removal of the depleted ammonia generating device 4.

The device that is removed may thus be regenerated later with ammonia in particular in a garage or dealership and service center having a dedicated installation therefor.

By way of a variant, the unlocking of the single connection members 36, 38 can be controlled automatically, for example, when the radio frequency identification (RFID) element, which communicates with the radio identification (RFID) chip, detects a movement of the ammonia generating device with respect to the floor 6 of the vehicle that is higher than a threshold limit value. In this case, the maneuvering of the gripping handle or handles will only allow the release of the upper part of the device from the floor.

The setting in place of the new device is carried out by inserting the latter in the opening 8 provided for this purpose in the floor, and then by connecting the first and second single connection members 36, 38 and by locking their connection, for example, by the maneuvering of one of the gripping handles 32. In a similar fashion, the upper part of the device 4 is secured to the floor 6 by a dedicated locking system.

During the setting in place of the new device, the latter is detected by the ECU of the vehicle that sets in place the electrical and fluid connections. The ECU is capable of detecting the approved ammonia generating devices and allows the fluid and electrical connections only for such devices. Thus, the safe use of the device is guaranteed.

In a similar fashion, the ECU is capable of analyzing a new system installed and, in particular, to verify its ammonia filling rate. The ECU may also have at its disposal various other details and information such as the number of times that the device has been regenerated, any eventual failures occurring during regeneration, etc.; this information allows the ECU to assess the state of fatigue of the device and in particular the wear and tear on its heating device.

During after-sales service, the device can be probed and queried prior to any regeneration step so as to be identified and to determine its particular characteristics, such as its age, the number of times that it has been regenerated, the number of kilometers travelled while mounted on a vehicle, etc. This information is important because after a number of regeneration cycles the saturated ammonium salt should be changed, with the adsorption reaction becoming of a mediocre quality after a certain number of regeneration cycles.

Moreover, if defects and deficiencies were encountered during the use of the device, the latter would thus be disclosed, which would allow the technicians in charge of the device to act accordingly, in particular by repairing it, for example, by replacing its heating device or by disposing of it.

The invention is not limited to the embodiment described here above, in particular the ammonia generating device may be installed in any other accessible place in the vehicle, and in particular hidden behind or under a hatch.

In a similar fashion, the locking mechanism ensuring the maintaining of the ammonia generating device 4 in position on the floor 6 of the vehicle may be independent of the gripping handles 32 and may, for example, comprise a system similar to a vehicle door lock system, this system can be controlled by a control located in the trunk of the vehicle or on the dashboard.

Such an ammonia generating device 4 has the advantage of having a secure fluid connection, any emanation of ammonia being stopped as soon as the various locking systems are disabled.

Moreover, the discharge channel 34 serves to remove the ammonia released accidentally into the space 30 towards the exterior of the vehicle and thus makes it possible to prevent any risk of poisoning of passengers in the vehicle.

Advantageously, the first and second single connection members 36, 38 may each be protected by a stopper type closure system, not shown, which is set in place as soon as the device is extracted from its housing and/or as soon as one of the locking systems is disabled, thereby making these members inaccessible to the user. Such a closure system also has the advantage of preventing any pollution by exterior elements such as dust or water.

By way of a variant, only the tank can be removed from the vehicle. In this embodiment, not shown, the protective receptacle and the heating element remain permanently in the vehicle, the heating element being adapted to heat the saturated ammonium salt through the metal walls of the tank. In this case, the gripping handles are provided in a material that conducts very little or no heat in a manner to protect the user maneuvering the tank.

Figure 2:
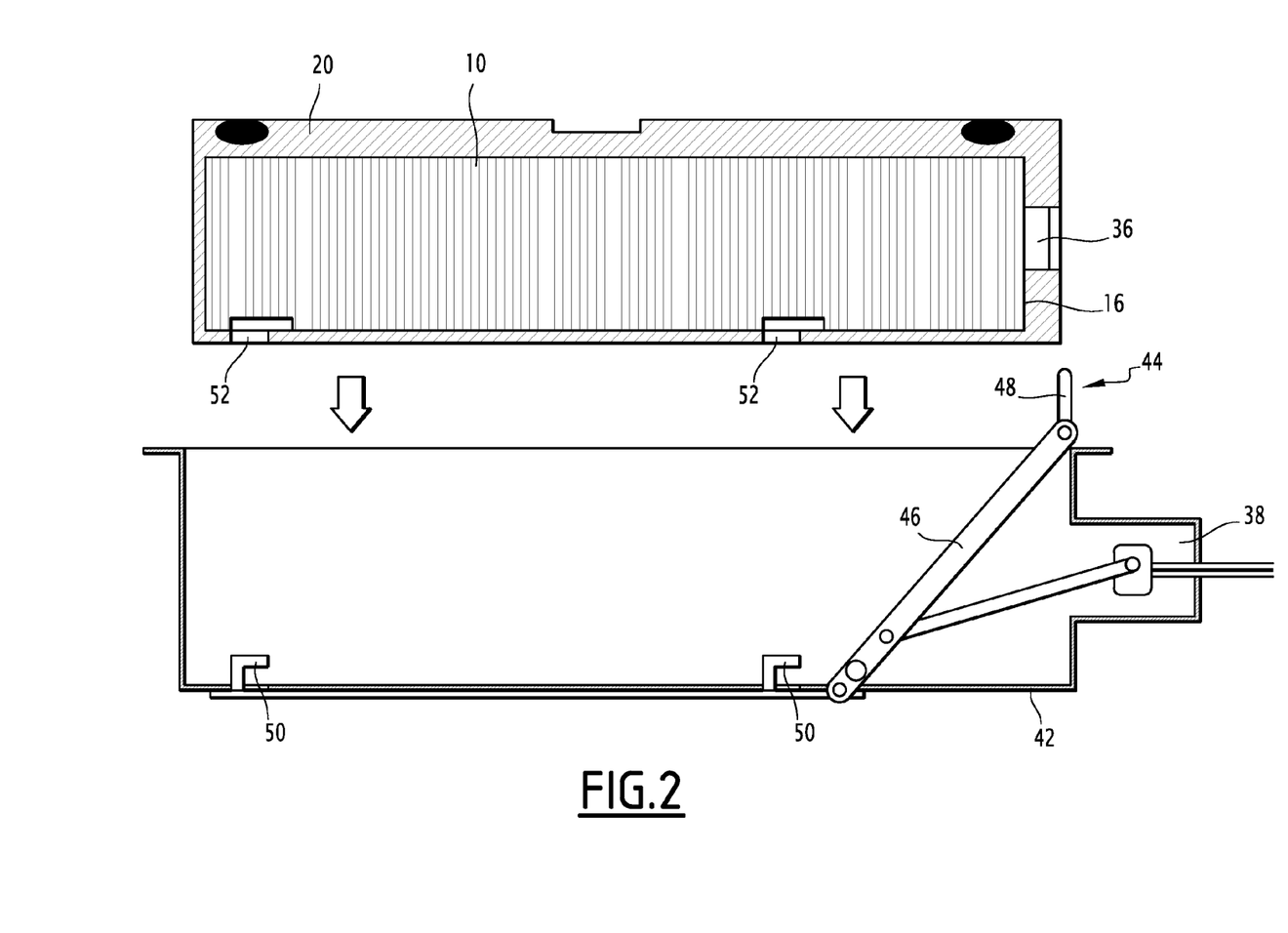
FIG. 2 shows an ammonia generating device according to an alternative embodiment during the course of its installation in a housing provided for this purpose in the trunk of a motor vehicle.
Figure 3:
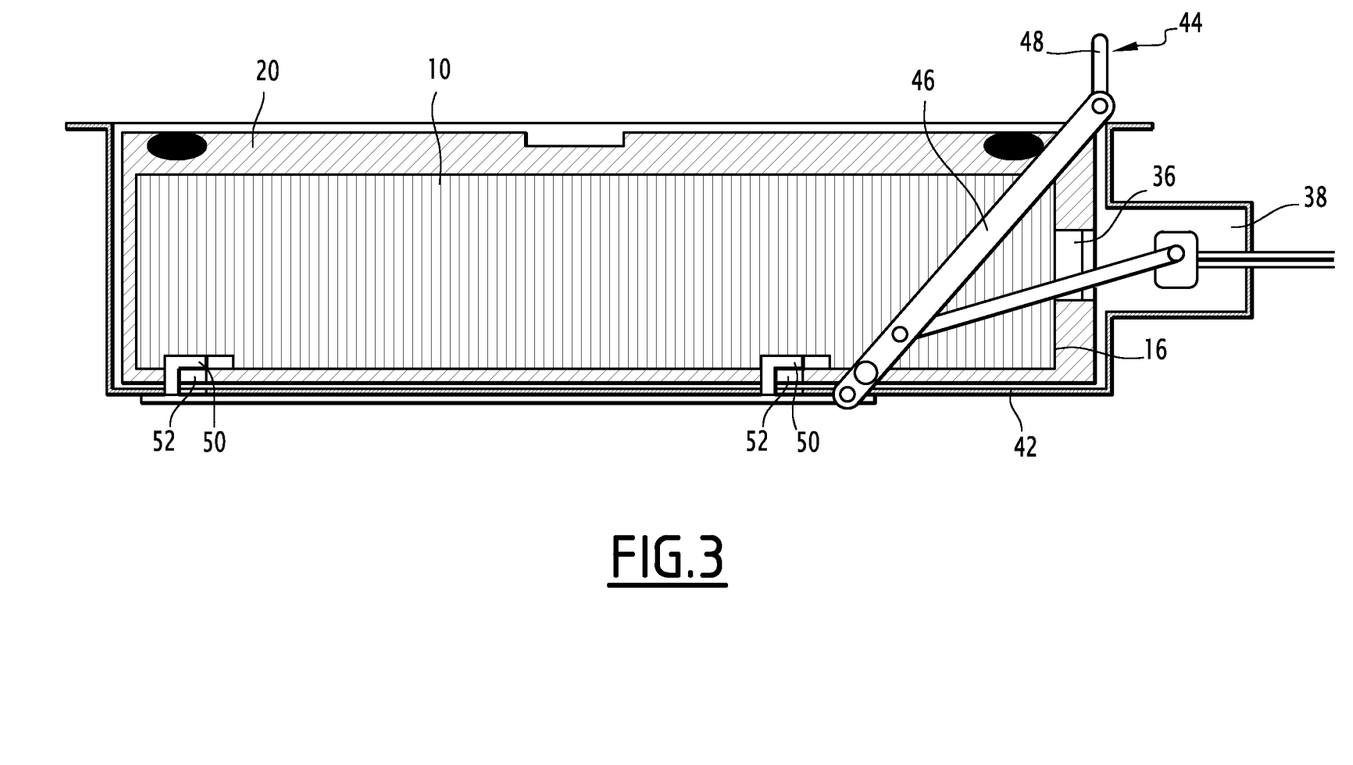
FIG. 3 shows the ammonia generating device of FIG. 2 in an unlocked position.
Figure 4:
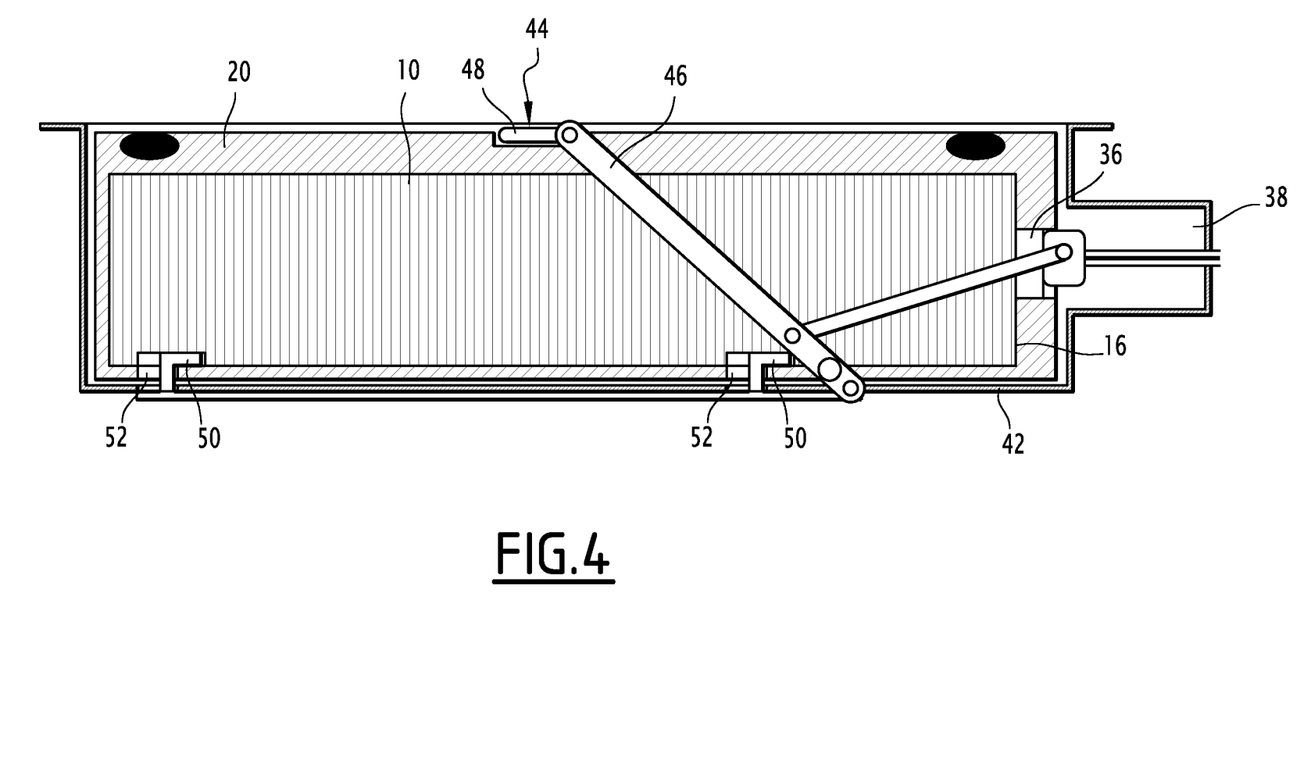
FIG. 4 shows the ammonia generating device of FIG. 2 in a locked position.

As shown in FIGS. 2 to 4, the ammonia generating device can have a first single connection member 36, disposed at the front wall 16 of the tank 10, intended to cooperate with a second single connection member 38 situated at the lateral wall of a housing 42 intended for accommodating the device.

In this embodiment, the locking mechanism for ensuring the anchoring of the device on the floor may be securely fixed to the vehicle, such a mechanism is represented as reference 44 in FIGS. 2 to 4. The mechanism includes a lever 46 that may be operated by means of a handle 48, the lever 46 controlling the movement of pins 50 intended to cooperate with openings 52 provided for this purpose in the bottom wall 22 of the device.

Thus, during its installation on the vehicle, during the course of a first step shown in FIG. 3, the device 4 is positioned in the housing 42 of the vehicle. During this step, the locking mechanism has not been activated, which means that the handle 48 is released and thus the pins 50 are not positioned in the openings 52 of the protective receptacle. In addition, in this first step the first and second single connection members 36 and 38 even if they are arranged facing each other do not cooperate with each other, which means that there is no electrical connection between the first and second electrical connectors and no fluid connection between the first and second fluid connectors.

During the course of a second step shown in FIG. 4, the lever 46 is displaced which results in the engagement of the locking mechanism. This engagement then enables the positioning of the pins 50 in the openings 52, and the cooperation of the first and second single connection members 36 and 38 in a manner to enable the electrical connections between the first and second electrical connectors, and the establishment of fluid connections between the first and the second fluid connectors.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An ammonia generating device to be used for the treatment of exhaust gases of internal combustion engines for motor vehicles, comprising:
   a tank having a body capable of releasing ammonia by desorption;
   a first single connection member comprising an electrical connection to supply the ammonia generating device with electricity and a fluid connection to allow evacuation of the ammonia produced following the desorption reaction; and
   wherein the first single connection member is capable of being releasably assembled by a locking-unlocking system with a second single connection member connected to an electrical power supply as well as to an exhaust line of an engine, said second single connection member comprising an electrical connection and a fluid connection, and wherein the assembly of the first and the second single connection members causes the engagement with one another jointly of the electrical connections belonging respectively to the first and second single connection members and of the fluid connections belonging respectively to the first and second single connection members.

2. The device according to claim 1, including a heating device disposed within the tank to heat the body in the tank and to thereby induce the desorption reaction.

3. The device according to claim 1, wherein the body that is capable of releasing ammonia is in a form of flat discs whose exterior diameter has a shape that is complementary to an interior wall of the tank.

4. The device according to claim 1, wherein the tank is disposed within a protective receptacle.

5. The device according to claim 1, including at least one gripping handle.

6. The device according to claim 1, wherein the first single connection member and the locking unlocking system is controlled by a user.

7. The device according to claim 1, wherein the locking unlocking system is actuated by maneuvering a gripping handle.

8. The device according to claim 1, including a memory element that is read/write accessible to obtain information and details specific to the ammonia generating device and wherein the memory element comprises a radio frequency identification (RFID) chip.

9. The device according to the claim 1, wherein the locking-unlocking system is shiftable between a locking position in which the first and second single connection members are locked to one another and an unlocking position in which the first and second single connection members are not locked to one another, the shifting of the locking-unlocking system to the locking position causing the engagement with one another jointly of the electrical connections belonging respectively to the first and second single connection members and of the fluid connections belonging respectively to the first and second single connection members.

10. The device according to the claim 1, wherein the second single connection member is a single part bearing both the electrical connection and the fluid connection.

11. An ammonia generating device to be used for the treatment of exhaust gases of internal combustion engines for motor vehicles, comprising:
  a tank having a body capable of releasing ammonia by desorption, wherein the tank is disposed within a protective receptacle;
  a first single connection member comprising an electrical connection to supply the ammonia generating device with electricity and a fluid connection to allow evacuation of the ammonia produced following the desorption reaction; and
  wherein dimensions of the protective receptacle are greater than dimensions of the tank such that a space is left between at least one wall of the tank and at least one wall of the protective receptacle.

12. The device according to claim 11, wherein the space is filled with an insulating foam to reduce a transfer of heat between walls of the tank and walls of the protective receptacle.

13. The device according to claim 11, wherein the protective receptacle comprises a discharge channel communicating with the space extending between the tank and the protective receptacle and adapted to evacuate the ammonia present in the space.

14. A motor vehicle comprising:
  an ammonia generating device to be used for the treatment of exhaust gases of internal combustion engines, the ammonia generating device including a tank having a body capable of releasing ammonia by desorption, and a first single connection member comprising an electrical connection to supply the ammonia generating device with electricity and a fluid connection to allow evacuation of the ammonia produced following the desorption reaction;
  a second single connection member connected to an electrical power supply as well as to an exhaust line of an engine, said second single connection member comprising an electrical connection and a fluid connection; and
  wherein the first single connection member is capable of being releasably assembled by a locking-unlocking system with the second single connection member, and wherein the assembly of the first and the second single connection members causes the engagement with one another jointly of the electrical connections belonging respectively to the first and second single connection members and of the fluid connections belonging respectively to the first and second single connection members.

15. The vehicle according to claim 14, wherein the locking-unlocking system mechanism is designed to ensure that the ammonia generating device is maintained in position in a housing mounted in the vehicle.

16. A motor vehicle comprising:
  an ammonia generating device to be used for the treatment of exhaust gases of internal combustion engines, the ammonia generating device including a tank having a body capable of releasing ammonia by desorption, and a first single connection member comprising an electrical connection to supply the ammonia generating device with electricity and a fluid connection to allow evacuation of the ammonia produced following the desorption reaction; and
  a locking-unlocking system designed to ensure that the ammonia generating device is maintained in position in a housing mounted in the vehicle, and wherein the locking-unlocking system comprises a lever controlling engagement of first and second single connection members in a manner to enable the engagement with one another of the electrical connection and the fluid connection belonging respectively to the first and second single connection members.

17. The vehicle according to claim 16, wherein the lever controls the movement of pins intended to cooperate with openings provided in a wall of the ammonia generating device.

* * * * *

UNITED STATES PATENT AND TRADEMARK OFFICE
CERTIFICATE OF CORRECTION

PATENT NO.         : 9,869,224 B2
APPLICATION NO.    : 13/906855
DATED              : January 16, 2018
INVENTOR(S)        : Xavier Bartolo and David Gafforelli Page 1 of 1

It is certified that error appears in the above-identified patent and that said Letters Patent is hereby corrected as shown below:

In the Claims

In Claim 6, Column 9, Line 13; replace "locking unlocking system" with --locking-unlocking system--

In Claim 7, Column 9, Lines 15-16; replace "locking unlocking system" with --locking-unlocking system--

In Claim 15, Column 10, Line 31; after "locking-unlocking system" delete "mechanism"

Signed and Sealed this
Second Day of October, 2018

Andrei Iancu
*Director of the United States Patent and Trademark Office*